United States Patent Office 3,745,164
Patented July 10, 1973

---

3,745,164
PREPARATION OF BUTYROLACTAM AND VALEROLACTAM
Edward G. Adamek, Toronto, Ontario, Canada, assignor to Du Pont of Canada Limited, Montreal, Quebec, Canada
No Drawing. Filed July 27, 1971, Ser. No. 166,620
Claims priority, application Canada, Aug. 28, 1970, 91,927
Int. Cl. C07d 27/08
U.S. Cl. 260—293.52                14 Claims

ABSTRACT OF THE DISCLOSURE

The manufacture of the lactams containing 4 or 5 carbon atoms (4-butyrolactam and 5-valerolactam) in which succinimide and glutarimide, or mixtures thereof, are reacted with hydrogen in the presence of a hydrogenation catalyst at a pressure of about from 1 to 1000 atmospheres and at a temperature of about from 230 to 300° C. in the absence of a solvent, and isolating the lactams formed.

BACKGROUND OF THE INVENTION

This invention relates to a process for the manufacture of lactams, and in particular to the manufacture of 2-pyrrolidone, frenquently referred to as 4-butyrolactam, and of 2-piperidone, frequently referred to as 5-valerolactam, and of mixtures thereof. In the specification hereinafter the aforesaid two substances will be referred to by the terms 4-butyrolactam and 5-valerolactam.

Butyrolactam and derivatives of butyrolactam may be used for a wide variety of commercial and industrial applications as binders, stabilizing agents and other additives in the chemical industry, as protective coatings as well as in oil drilling operations and in the preparation of polymers such as nylon-4.

U.S. Pat. 2,351,939, issued to Drossbach et al. on June 20, 1944, describes the preparation of lactams from the corresponding acids using hydrogenation and dehydration catalysts. Succinimide may be catalytically converted to butyrolactam in the presence of a solvent such as dioxane, cyclohexane and tetrahydrofuran. Hydrogenation of N-substituted-succinimide and -glutarimide to the corresponding lactams using a Raney nickel catalyst in a solvent is described by Paden et al. in Journal of American Chemical Society, 58, 2487 (1936) but the difficulties of hydrogenating the unsubstituted imides were noted. The preparation of butyrolactam from succinic acid derivatives in the presence of a solvent has also been described.

The object of the present invention is the manufacture of butyro- and/or valerolactam in a one-step catalyzed hydrogenation process in the absence of a solvent.

SUMMARY OF THE INVENTION

Accordingly, the present invention provides a process for the manufacture of lactams containing 4 to 5 carbon atoms comprising hydrogenating an imide selected from the group consisting of succinimide and glutarimide, and mixtures thereof, with hydrogen in the presence of a catalyst at a pressure of 1 to 1000 atmospheres and at a temperature of 230 to 300° C. in the absence of a solvent for the imide, and isolating the lactams produced.

The invention also provides butyro- and/or valerolactam made by a one-step hydrogenation process in the absence of a solvent.

DESCRIPTION OF THE PREFERRED EMBODIMENTS

Lactams according to the invention may be prepared from the coresponding imides by catalytic hydrogenation in the absence of a solvent. A high pressure reaction vessel, in particular an autoclave, may be charged with the imide and a hydrogenation catalyst at a catalyst concentration of 0.01–10.0% based on the weight of imide used. The reaction vessel is then usually pressurzied with hydrogen to the pressure required, at the temperature prevailing in the vessel at the time of pressurization, to give the desired hydrogen pressure in the range 1 to 1000 atmospheres at the subsequent reaction temperature.

The temperature of the reaction vessel is advantageously then raised to the required reaction temperature in the range 230–300° C. with these reaction conditions being maintained for up to 600 minutes after reaching the reaction temperature. The reaction vessel may then be cooled and vented and the lactam may be recovered by conventional techniques.

The preferred embodiments for the preparation of the lactams comprise the hydrogenation of an imide selected from the group consisting of succinimide and glutarimide, and mixtures thereof, using a hydrogenation catalyst selected from the group consisting of the metals nickel, platinum, palladium, rhenium and cobalt and such metals supported on inert substances and from the salts of nickel, cobalt and copper. A catalyst concentration of 0.5 to 2.0% based on the weight of imide is preferred. Suitable catalysts may be obtained commercially. The hydrogenation is preferably carried out at a hydrogen pressure in the range 200 to 600 atmospheres, at a temperature of 250 to 280° C. and for a reaction time of at least 15 minutes. The preferred reaction conditions are a hydrogen pressure of 400–550 atmospheres, a reaction temperature of 260–275° C., a reaction time of 30 to 90 minutes and a catalyst concentration of 0.5 to 2.0%.

It will readily be understood that the process of the present invention lends itself to continuous operation as well as the batch-type operation described herein.

At reaction temperatures below 230° C. the rate of reaction may be very slow while at temperatures above 300° C. decomposition of the reactants or the products of the reaction may occur.

The lactams may be isolated from the reaction product by standard techniques, in particular by distillation and crystallization.

The invention may be illustrated in greater detail by the following examples.

EXAMPLE 1

A 100-ml. stainless steel rocking autoclave was charged with 10 g. of succinimide and 1 g. of a barium-promoted copper chromite catalyst, available from Girdler Co. under the trademark "G–22." After pressurizing the autoclave at room temperature with hydrogen, the temperature was raised over a period of 30 minutes to 270° C. and maintained for a reaction time of 5 hours. The pressure in the autoclave rose to 510 atmospheres and levelled off at 480 atmospheres. The rocking action of the autoclave was maintained throughout the entire heating period. After subsequent cooling of the reaction mixture over a period of 30 minutes to a temperature below 100° C. and venting the autoclave, the liquid product was analyzed by gas chromatography. The yield of 4-butyrolactam was 80% based on the weight of succinimide used, while about 3% of the succinimide remained unchanged. No pyrrolidine was detected.

EXAMPLE 2

Using the method described in Example 1, the autoclave was charged with 6 g. glutarimide and 0.6 g. of Girdler's "G–22" copper chromite catalyst. During the run a hydrogen pressure of 450 atmospheres was attained. The liquid product contained 5-valerolactam in 50% yield, about 1% glutarimide and some piperidine.

EXAMPLE 3

Using the method described in Example 1, the autoclave was charged with 6 g. of a mixture of 21 parts of succinimide and 73 parts of glutarimide and as catalyst 0.6 g. of Girdler's "G-22" copper chromite catalyst. The temperature was maintained at 260° C. and a hydrogen pressure of 440 atmospheres was attained. When a reaction time of 300 minutes was used the liquid product contained 4-butyrolactam in 76% yield, 5-valerolactam in 52% yield, traces of succinimide and glutarimide, and about 3% of the cyclic imines, pyrrolidine and piperidine. In a similar experiment using a reaction time of 100 minutes, 4-butyrolactam and 5-valerolactam were formed in yields of 74% and 44% respectively with only traces of succinimide, glutarimide, pyrrolidine and piperidine. If the reaction time was shortened to 20 minutes the yields of 4-butyrolactam and 5-valerolactam were 77% and 46% respectively while 6% of the imides remained unchanged.

EXAMPLE 4

Using the method described in Example 1, the autoclave was charged with 10 g. of succinimide and 1 g. of a 65% nickel on kieselguhr catalyst sold by Girdler Co. under the trademark "G-49." The reaction time was one hour at 270° C. and a hydrogen pressure of 370 atmospheres was attained. The liquid reaction product contained 4-butyrolactam in 69% yield and a small amount of pyrrolidine.

EXAMPLE 5

Using the method of Example 1, the autoclave was charged with 6 g. of glutarimide and 0.6 g. of Girdler's "G-49" nickel catalyst. The reaction time was one hour at 270° C. at a hydrogen pressure of 490 atmospheres. The liquid product contained valerolactam in 70% yield and small amounts of glutarimide and piperidine.

EXAMPLE 6

Using the method of Example 1, the autoclave was charged with 5 g. of succinimide and 0.05 g. of a 52% nickel on kieselguhr catalyst sold by Girdler Co. under the trademark "G-49." The reaction time was 1.5 hours at 273° C. with a hydrogen pressure of 575 atmospheres. The liquid product contained 4-butyrolactam in 65% yield and pyrrolidine was not detected.

EXAMPLE 7

Using the method of Example 1, the autoclve was charged with 6 g. of a mixture of 23 parts of succinimide, 73 parts of glutarimide and 0.07 g. of Girdler's "G-49" nickel catalyst, which corresponds to a 1.1% catalyst concentration based on the amount of imide used. The reaction time was one hour and a hydrogen pressure of about 465 atmospheres was attained. The reaction product contained yields of 72 and 58% of 4-butyrolactam and 5-valerolactam respectively.

EXAMPLE 8

Using the reaction conditions of Example 1, the autoclave was charged with 4 g. mixture of 23 parts of succinimide, 73 parts of glutarimide and 0.4 g. of Girdler's "G-49" nickel catalyst. The reaction was carried out at 249° C., for one hour at a hydrogen pressure of 70 atmospheres. 4-butyrollactam and 5-valerolactam were produced in yields of 56 and 51% respectively and quantities of the imides were detected.

EXAMPLE 9

Using the method of Example 1, the autoclave was charged with 5 g. of a mixture of 23 parts of succinimide and 73 parts of glutarimide. The catalyst was 0.1 g. of 5% platinum on carbon. The reaction was carried out at 270° C. for one hour at a hydrogen pressure of 500 atmospheres. The liquid reaction product contained 4-butyrolactam and 5-valerolactam in yields of 74 and 66%.

If the above experiment was repeated using a 5% palladium-on-alumina catalyst, at the same catalyst concentration as the previous run, the product contained yields of 89 and 52% of 4-butyrolactam and 5-valerolactam respectively and considerable quantities of the cyclic imines, pyrrolidine and piperidine.

EXAMPLE 10

Using the reaction conditions of Example 9, a nickelous acetate·4H$_2$O catalyst at a 3.5% catalyst concentration, was used which gave yields of 46 and 36% of butyrolactam and 5-valerolactam respectively. Using of cobaltous acetate·4H$_2$O catalyst at the same concentration gave yields of 47% for 4-butyrolactam and 42% for 5-valerolactam.

I claim:

1. A process for the manufacture of lactams containing 4 to 5 carbon atoms which comprises hydrogenating an imide selected from the group consisting of succinimide and glutarimide, and mixtures thereof, with hydrogen in the presence of a hydrogenation catalyst at a pressure of 1 to 1000 atmospheres and in the absence of a solvent.

2. A process of claim 1 wherein temperature during hydrogenation is about from 230 to 300° C.

3. The process of claim 1 wherein the hydrogenation catalyst consists essentially of nickel.

4. The process of claim 1 wherein the hydrogenation catalyst consists essentially of platinum.

5. The process of claim 1 wherein the hydrogenation catalyst consists essentially of palladium.

6. The process of claim 1 wherein the hydrogenation catalyst consists essentially of cobalt.

7. The process of claim 1 wherein the hydrogenation catalyst consists essentially of copper.

8. A process of claim 1 wherein the pressure is in the range of about from 200 to 600 atmospheres.

9. The process of claim 8 wherein the temperature is about from 250 to 280° C.

10. The process of claim 1 wherein the pressure is in the range of about from 400 to 550 atmospheres, and the temperature is in the range of about from 260 to 275° C.

11. The process of claim 1 wherein hydrogenation catalyst concentration is about from 0.01 to 10% based on the weight of imide.

12. The process of claim 1 wherein the catalyst concentration is about from 0.2 to 2% based on the weight of imide.

13. The process of claim 2 wherein the hydrogenation catalyst contains 0.01 to 10% nickel, based on the weight of imide.

14. The process of claim 13 wherein the pressure is in the range of about from 200 to 600 atmospheres, and the temperature is in the range of about from 250° to 280° C.

References Cited

UNITED STATES PATENTS 3,092,638   6/1963   Liao et al. _____ 260—326.5
3,681,387   8/1972   Hollstein et al. _____ 260—326.5

OTHER REFERENCES

Paden, J. H., et al.: "The Synthesis of Pyrrolidines, Piperidines and Hexahydroazepines," J. of Amer. Chem. Soc., vol. 58, pp. 2489–91 (1936).

HENRY R. GILES, Primary Examiner

M. M. CROWDER, Assistant Examiner

U.S. Cl. X.R.

260—326.5 FN